United States Patent

[11] 3,562,600

[72] Inventor: Karl-Heinz Koenig, Stuttgart, Germany
[21] Appl. No.: 750,911
[22] Filed: Aug. 7, 1968
[45] Patented: Feb. 9, 1971
[73] Assignee: Zeiss Ikon Aktiengesellschaft, Stuttgart, Germany, a corporation of Germany
[32] Priority: Aug. 19, 1967
[33] Germany
[31] Z13,000

[54] TRIGGER CIRCUIT CONTROLLED DEVICE FOR SHUTTER SPEED ADJUSTMENT IN PHOTOGRAPHIC CAMERAS
4 Claims, 4 Drawing Figs.

[52] U.S. Cl. .................................................. 317/142, 317/148.5, 317/153; 95/10, 95/53
[51] Int. Cl. .................................................. H01h 47/32, G03b 9/00

[50] Field of Search .......................................... 317/142, 148.5TD, 153; 95/10, 53, (Inquired)

[56] References Cited
UNITED STATES PATENTS
3,355,632  11/1967  Wallentowitz ................ 317/142

Primary Examiner—Lee T. Hix
Attorney—Singer, Stern & Carlberg

ABSTRACT: The trigger circuit controlled device of the invention performs an adjustment of the shutter speed in photographic cameras and includes in a bridge circuit a variable chargeable capacitor, a number of transistors and means forming compensation and comparison voltage sources which provide that the shutter speed adjustment is independent of the battery voltage which energizes the bridge circuit and also is independent of ambient temperature changes.

INVENTOR
Karl Heinz KÖNIG

TRIGGER CIRCUIT CONTROLLED DEVICE FOR SHUTTER SPEED ADJUSTMENT IN PHOTOGRAPHIC CAMERAS

The invention relates to trigger circuit controlled shutter speed adjustments in photographic cameras.

It is known that electronic shutters have proven to be superior to mechanical speed adjusting mechanisms as far as the accuracy and reproducibility of shutter speed adjustments is concerned. This advantage, however, is in part offset by the dependency of the electronic time forming devices on the battery voltage and the ambient temperature. This explains the exposure time tolerance of ± 8 percent encountered in known circuits.

The means presently available for stabilizing the supply voltage involve, first of all, a rather substantial increase in structural elements. Furthermore, they reduce the available power supply of the electronic shutter so that the supply battery can be made use of only to a lesser degree. Still unsolved remains the problem of stabilizing the temperature and this is just as important as the problem of stabilizing the power supply.

It has also been proposed to make the supply voltage dependent on the temperature in opposition to the electronic shutter, for example by the use of thermistors, but this would still leave the problem of voltage stabilization open.

The object of the present invention is to create with simple and effective means a voltage and temperature independent electronic shutter speed adjusting device. The invention proceeds from a device for forming the shutter speed which is controlled by the trigger circuit, preferably in a photographic camera, and consists in that for the purpose of attaining a voltage and temperature independence of the time formation the trigger circuit is expanded to form a bridge circuit, whereby provision is made for compensation voltages which are oppositely directed to the bridge supply voltage.

The invention further includes the feature that in one branch of the bridge there is arranged a switch member having a variable charge fed by a power supply which consists of the bridge supply voltage minus the compensation voltage, while another branch of the bridge is provided with resistance members which produce a reference voltage (trigger threshold value voltage) and are energized by a voltage which is also reduced by the amount of the compensation voltage, whereby at the instant of balance of the bridge and simultaneous trigger release the charge potential of the switch member is equal to the reference voltage.

Another feature of the invention is that the means supplying the compensation voltages have the same temperature dependence as the circuit arrangement determining the activity of the trigger.

The principal concept of the invention is that the trigger threshold value which determines the changeover instant is made dependent from the power supply to the same extent as the variable charge potential of the switch member. Due to the fact that the trigger circuit is expanded to a bridge circuit which accommodates in its branches the switch member having a variable charge as well as means for producing a reference voltage which at the same time serves as trigger release voltage, the trigger circuit at the instant of release acts like a balanced bridge upon whose time of balance the supply voltage has no influence.

The temperature independence of the circuit is obtained in that the means contributory to determining the charge of the switch member having a variable charge is so selected that it has the same temperature dependence as the trigger arrangement forming the trigger threshold value.

The primary advantage of the invention, then, is the great insensitivity to voltage and temperature variations achieved with but a small structural expenditure and yielding the extra bonus of a better utilization of the battery, i.e. a longer life of the battery.

These and other objects of the invention will be described in further detail with reference to the accompanying drawings, in which.

Figure 1:
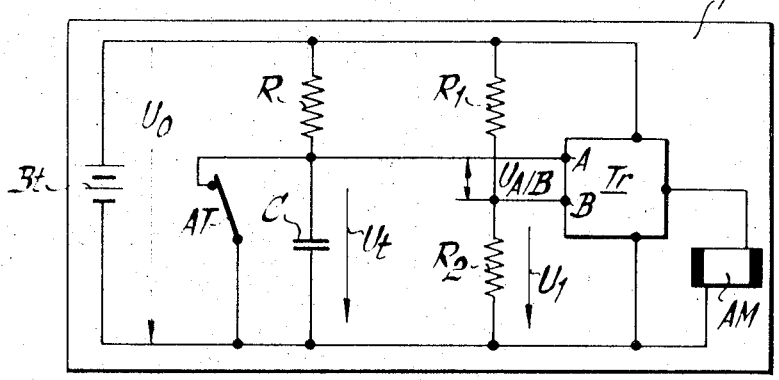
FIG. 1 is a circuit diagram according to the present invention.

Referring to FIG. 1, the basic circuit serving to obtain a voltage independence consists of a trigger block Tr which includes the electronic shutter means, a camera release key or button AT, a time resistor $R$, a time capacitor $C$ which is the circuit member having a variable charge, a battery Bt, a release magnet AM and voltage divider resistors $R_1$, $R_2$. While the trigger block Tr is disposed in the diagonal of the bridge circuit, the branches of the bridge contain on one hand the resistors $R_1$, $R_2$ and, on the other hand, the time resistor $R$ connected in series with the capacitor $C$. With $U_{A/B}$ is designated the diagonal potential between the points $A$ and $B$, while $U_1$ signifies the reference potential (trigger release potential) of the voltage divider $R_1$ and $u_t$ is the variable time-dependent charge potential of $C$.

The operation of the device is substantially as follows: On release of the camera the release contact AT is opened and the capacitor $C$ is charged in a period of time which depends on the resistor $R$ selected by the time adjustment. As soon as the charge $u_t$ of the capacitor is equal to the reference voltage $U_1$ of the voltage divider resistors $R_1$, $R_2$ and thus the balance of the bridge ($U_{AB} = 0$) is established, the trigger switches over and by means of the release magnet AM, which during the charging of the capacitor $C$ kept the shutter open, effects a closing of the shutter segments. The following considerations may aid in understanding the above effect:

The input voltage of the trigger may assumed to be infinitesimally small and the changeover may take place at $U_{A/B} = 0V$. Then the following equation applies to the lower loop of the circuit according to FIG. 1:

$$U_{A/B} + U_1 - u_t = 0$$
$$u_t - U_1 = U_{A/B} \qquad (1)$$

The assumption is that the trigger changeover takes place at a time when $U_{AB} = 0$ and this inserted in equation (1) yields $$u_t = U_1 \qquad (2)$$

The charging voltage for a capacitor is $$u_t = U_o(1 - e^{-t/RC}) \qquad (3)$$

and according to FIG. 1

$$U_1 = U_o \frac{R_2}{R_1 + R_2} \qquad (4)$$

The value of equations (3) and (4) inserted in equation (2) give and 
$$U_o(1 - e^{-t/RC}) = U_o \frac{R_2}{R_1 + R_2} \qquad (5)$$

$$t = RC \ln \frac{R_1 + R_2}{R_1}$$

$$\frac{t}{RC} = \ln \frac{1}{1 - \frac{R_2}{R_1 + R_2}}$$

and with $RC = \tau$, $\frac{t}{\tau} = \ln \frac{1}{1 - \frac{R_2}{R_1 + R_2}} \qquad (6)$ If in equation (6) the time constant $\tau$ is considered the independent variable and $t$ the nominal time, then the numerical value of this ratio requires a balance which must eventually equal $R_2/(R+R_2)$. This establishes the equilibrium of time and compensation values, because equ (6) is true only for $u_t = U_1$. If, on the other hand, the charge resistance $RC = \tau$ is varied with the factor $R_2/(R+R_2)$ remaining constant, i.e. $t/\tau=k$ or $t = \tau \times k$ (see equ. 6), then $t$ changes also proportional to $\tau$ as the trigger circuit is released at $u_t = U_1$. K stands symbolically for a constant value which is represented by the right side of equation (6). From this follows that the time equilibrium and the compensation relation are maintained also when the timing mechanism is changed over. Thus, equations (5) and (6) respectively furnish a value for the charging time of the capacitor from the input potential to $u_t = U_1$ which is independent of the battery voltage and lies within the required range of the operational voltage of the trigger circuit. The result is in exact compensation within a wide voltage range.

Figure 2:
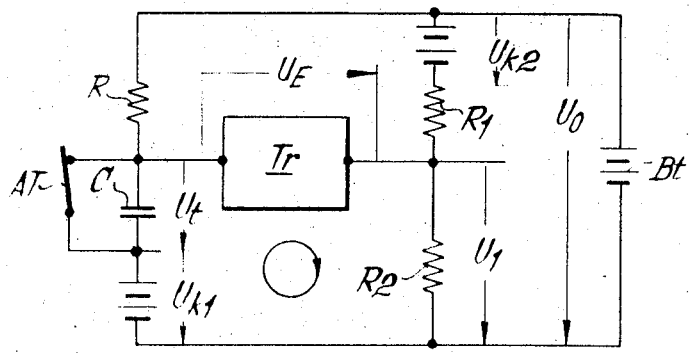
FIG. 2 is a circuit diagram similar to FIG. 1 and including compensation voltage sources.

FIG. 2 illustrates an expanded basic circuit which is characterized substantially by the addition of like or similar compensation voltage sources $U_{k1}$, $U_{k2}$ of which the voltage source $U_{k1}$ has a temperature coefficient which is equal to that of the trigger circuit Tr and particularly to the base-emitter distance of the input transistor of the trigger circuit Tr.

If these voltage sources $U_{k1,2}$ consist of diodes, then these diodes should be made of the same semiconductor material as the transistors of the trigger circuit Tr.

The operation of the circuit according to FIG. 2 is as follows:

For the purpose of compensating for a constant trigger input voltage $UE > 0$ required for the release of the shutter, a constant voltage $U_{k1,2}$ is connected in equal magnitudes to the charging circuit and the other branch of the bridge circuit. Equations (5) and (6) apply also in this case.

For the loop indicated in FIG. 2

$$U_E + U_1 = u_t + U_{k1} \quad (7)$$

Furthermore, according to FIG. 2, $$U_1 = (U_0 - U_{k2}) \frac{R_2}{R_1 + R_2} \quad (8)$$

and $$u_t = (U_0 - U_{k1})(1 - e^{-t/\tau}) \quad (9)$$

$$\tau = RC$$

If in equation (7) $U_E = U_{k1}$, then $$u_t = U_1 \quad (10)$$

and $$U_{k1} = U_{k2} \quad (10a)$$

and with the values of equations (8) and (9), $$(U_0 - U_k)(1 - e^{-t/\tau}) = (U_0 - U_k) \frac{R_2}{R_1 + R_2} \Big/ :(U_0 - U_k)$$

$$1 - e^{-t/\tau} = \frac{R_2}{R_1 + R_2}$$

$$e^{-t/\tau} = 1 - \frac{R_2}{R_1 + R_2}$$

$$e^{t/\tau} = \frac{1}{1 - \frac{R_2}{R_1 R_2}} = \frac{R_1 R_2}{R_1}$$

$$\frac{t}{\tau} = \ln \frac{R_1 + R_2}{R_1}$$

$$t = RC \ln \frac{R_1 + R_2}{R_1} \quad (11)$$

Equation (11) is identical with equation (5) so that also the expanded basic circuit which proceeds from the trigger input voltage $U_E > 0$, is in the shutter speed adjustment widely independent of the battery voltage. If, moreover, $U_E$ and $U_K$ have the same temperature relationship, then according to equation (7) the shutter speed adjustment is also dependent of the temperature.

Figure 3:
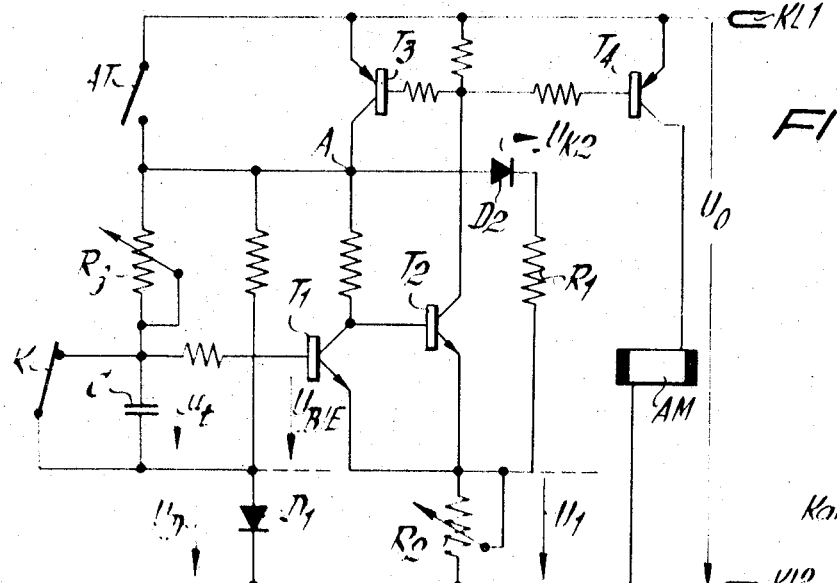
FIG. 3 is a bridge circuit diagram.

In the embodiment of the invention illustrated in FIG. 3 which takes the specific construction of the electronic shutter into consideration, the bridge circuit according to the invention is provided with diodes $D_1$ and $D_2$ for the purpose of producing a voltage independence and for eliminating temperature influences. The diode is so selected with respect to the input transistor that it has a temperature coefficient which is equal so that of the base-emitter distance of $T_1$.

The diode $D_1$ furnishes the compensation voltage $U_{k1}$ which is oppositely oriented to the bridge supply voltage $U_o$ and has the effect that the capacitor $C$ having a variable charge operates at a voltage which amounts to the bridge supply voltage $U_o$ minus the compensation voltage $U_{k1}$.

The diode $D_2$ furnishes analogous to the diode $D_1$ a compensation voltage $U_{k2}$ which is equal to the voltage $U_{k1}$ and has the effect that the voltage divider circuit $R_1$, $R_2$ is also energized by a voltage $U_o$ minus $U_{k2}$.

In FIG. 3, the transistors by and large constituting the triggers are designated with $T_1$, $T_2$. Their circuit is supplemented by the resistors $R_1$, $R_2$ and the diode $D_2$, all arranged in one branch, and the circuit elements, time resistor $R_2$, capacitor $C$ and diode $D_1$, arranged in the other branch, so as to form a bridge circuit. The coupled diode passing voltage $U_{k1}$ then corresponds approximately to the base-emitter voltage $U_{BE}$ of $T_1$, while $u_t$ designates the charging voltage of the capacitor $C$ and $U_1$ is the reference voltage of the resistors $R_1$, $R_2$.

The resistor $R_2$ arranged in one branch of the bridge circuit constitutes simultaneously the common emitter resistance of the trigger circuit $T_1$, $T_2$. Connected to the terminals K1 1 and K1 2 is the battery voltage $U_o$ of about 3 volts.

The transistor $T_3$ effects the closure of the switch contact AT and therewith the feeding of the trigger also after AT has been opened and up to the changeover moment. In the circuit of $T_4$ is arranged the release magnet AM which at the changeover moment effects the termination of the exposure time. K is a shutter contact which is opened by actuating AT.

The operation of the circuit according to FIG. 3 is as follows:

On release of the camera by actuating AT, the shutter and its contact K are opened and at the same time the battery voltage $U_o$ is connected to point A of the circuit. While now the time capacitor $C$ charges itself by way of $R_z$, a collector current flows through the transistors $T_2$, $T_3$ and $T_4$. $T_3$ takes care of automatically maintaining the condition, i.e. AT may open and still the battery voltage continues being connected to point A of the circuit. The collector current of $T_4$ flows through the release magnet AM which during the charging of capacitor $C$ keeps the shutter open until $T_1$ becomes conductive and turns $T_2$, $T_3$ and $T_4$ off. Now the release magnet is currentless and its descending armature releases by way of a lever mechanism the segments of the central shutter or the second curtain of a focal plane shutter, respectively, so that the picture window is again covered. The exposure is completed.

If the dimensions of the circuit according to FIG. 2 are so selected that the collector-emitter voltage of $T_2$ is extremely small, for example 0.1 volts (saturated transistor, i.e. the direct current amplification B is e.g. 10), then the collector resistor $T_2$ can take on the function of $R_1$ so that $R_1$ may be dispensed with.

Figure 4:
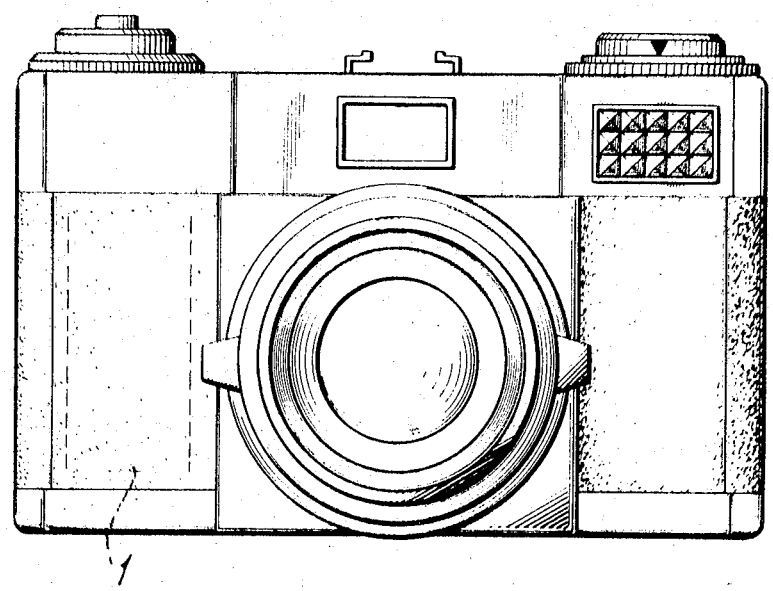
FIG. 4 illustrates a photographic camera equipped with the circuit arrangement of the present invention.

FIG. 4 indicates in dash lines the space where the circuit element of the invention may be arranged in the casing of the camera.

Summarizing it may be said that by a suitable dimensioning (equation 6) and arrangement of the circuit according to FIGS. 1 to 3 the trigger threshold value and the charging voltage of the capacitor at the instant of release of the camera can always be kept at the same magnitude regardless of the battery voltage. This has the result that the exposure time adustment of the shutter speed is independent of the battery voltage. At the same time, the special construction of the circuit according to FIG. 2 makes also a temperature compensation possible.

The heretofore accepted exposure time tolerance of ± 8 percent of the circuit may with simple and inexpensive means according to the invention be reduced to about ± 1 percent.

The invention may also be used in connection with electronic shutters in which the exposure time is automatically controlled by photocells so that no additional means for electronically stabilizing the supply voltage of the photocell is necessary.

I claim:

1. A trigger circuit controlled device for the shutter speed adjustment in a photographic camera, including a trigger circuit for attaining a voltage and temperature independence of the shutter speed adjustment combined with means forming a bridge circuit, means arranged in the branches of said bridge circuit for forming therein compensation voltages ($U_{k1,2}$) which are oppositely oriented to the bridge supply voltage ($U0$), a capacitor ($C$) of variable charging capacity arranged in one branch of said bridge circuit, a source of voltage for charging said capacitor comprising the bridge supply voltage ($U0$) reduced by one of said compensation voltages ($U_{k1}$), while another bridge branch has arranged therein resistance means furnishing a comparison voltage ($U_1$), said resistance means being energized by a voltage ($U0$) also reduced by one of said compensation voltages ($U_{k2}$), whereby at the instant of balance of the bridge circuit and simultaneous release of the trigger the charging voltage of said capacitor is equal to said comparison voltage, and means producing said compensation voltages ($U_{k1,2}$) having the same temperature dependence as the circuit controlling the switch operations of the trigger.

2. A device according to claim 1, in which said means for producing said compensation voltages ($U_{k1,2}$) consist of similar diodes ($D_1$, $D_2$).

3. A device according to claim 2, in which the voltage furnished by one of said diodes ($D_1$) is in magnitude equal to the base-emitter distance of an input transitor ($T_1$), said diode being so selected that it has the same temperature response as said base-emitter distance.

4. A device according to claim 1, in which one of said resistance means arranged in one branch of said bridge circuit and used for producing said comparison voltage consists of a variable resistor ($R_2$) which simultaneously forms a common emitter resistance for said trigger circuit ($T_1$, $T_2$).